US007506485B2

(12) United States Patent
Quinn et al.

(10) Patent No.: US 7,506,485 B2

(45) Date of Patent: Mar. 24, 2009

(54) SIZE ADAPTING CONVEYING SYSTEM FOR CARTONS

(75) Inventors: Kerry Quinn, Palatine, IL (US); John Levander, South Elgin, IL (US); Cameron Mikos, Wheaton, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 11/685,601

(22) Filed: Mar. 13, 2007

(65) Prior Publication Data

US 2007/0214746 A1 Sep. 20, 2007

Related U.S. Application Data

(60) Provisional application No. 60/782,007, filed on Mar. 14, 2006.

(51) Int. Cl.
*B65B 61/20* (2006.01)
*B65G 15/44* (2006.01)

(52) U.S. Cl. ........................ 53/136.1; 53/415; 198/698

(58) Field of Classification Search .................. 53/415, 53/492, 58, 128.1, 135.1, 136.1; 198/698.1, 198/690.2, 697, 698, 699, 836.1
See application file for complete search history.

(56) References Cited

U.S. PATENT DOCUMENTS

| | | | | | |
|---|---|---|---|---|---|
| 2,216,884 | A | * | 10/1940 | Kott | 53/127 |
| 3,279,601 | A | * | 10/1966 | James | 209/633 |
| 3,328,936 | A | * | 7/1967 | Billeb | 53/450 |
| 3,474,727 | A | * | 10/1969 | Kampf | 101/219 |
| 3,894,380 | A | | 7/1975 | Poulsen | |
| 4,184,305 | A | * | 1/1980 | Baker et al. | 53/50 |
| 4,263,766 | A | * | 4/1981 | Baker et al. | 53/50 |
| 4,265,355 | A | * | 5/1981 | Davis | 198/427 |
| 4,317,319 | A | | 3/1982 | Price | |
| 4,462,851 | A | * | 7/1984 | Colgate, Jr. | 53/411 |
| 4,503,659 | A | * | 3/1985 | Sherman | 53/491 |
| 4,664,740 | A | * | 5/1987 | Wilkinson | 156/540 |
| 4,738,359 | A | * | 4/1988 | Phillips, Jr. | 206/256 |
| 4,969,305 | A | * | 11/1990 | York et al. | 53/136.1 |
| 5,168,883 | A | | 12/1992 | Winn | |
| 5,207,331 | A | | 5/1993 | Teegarden et al. | |
| 2004/0045676 | A1 | * | 3/2004 | Chojnacki et al. | 156/350 |
| 2004/0084130 | A1 | | 5/2004 | Michalski et al. | |

* cited by examiner

*Primary Examiner*—Paul R Durand
(74) *Attorney, Agent, or Firm*—Cardinal Law Group

(57) ABSTRACT

A system for applying a stamp to packs within a carton includes a conveyor system including a plurality of spring arms and a ceiling plate positioned above the spring arms. The system also includes a carton opening system positioned at a first station along the conveyer system, a pack stamping system positioned at a second station along the conveyer system, and a carton closing system positioned at a third station along the conveyor system; wherein the spring arms bias the cartons against the ceiling plate to position the packs at a predetermined distance form the carton opening system, pack stamping system and carton closing system. A method for applying a stamp to packs within a carton includes biasing the carton along a conveyor system, and positioning the packs within the carton at a predetermined location from operation stations based on the biasing.

11 Claims, 6 Drawing Sheets

FIG. 2

SIZE ADAPTING CONVEYING SYSTEM FOR CARTONS

RELATED APPLICATIONS

This application claims the benefit of U.S. Provisional Patent Application 60/782,007 filed Mar. 14, 2006, the entirety of which is incorporated herein by reference.

TECHNICAL FIELD OF THE INVENTION

The present invention relates generally to conveying systems and in particular a conveying system for cigarette cartons.

BACKGROUND OF THE INVENTION

Many jurisdictions tax the sale of cigarettes. Cigarettes are most typically distributed in boxes, each box including 30 cartons of cigarettes, and each carton containing 10 packs of cigarettes, and each pack includes 20 cigarettes. There is no industry standard for the size of cigarettes or cartons. Therefore, cartons of cigarettes are distributed in a variety of heights and widths, depending on the brand and the dimensions of cigarettes for that brand. The packs are disposed inside each one of the cartons within an array comprising two rows of packs with each row of packs comprising five packs. In other words, the cigarette packs are disposed within an array comprising two rows and five columns.

Generally, payment of the tax is evidenced by application of a stamp to each pack of cigarettes prior to distribution to a retailer. However, cigarette manufacturers often do not know the retail destination of each carton, and therefore distribute un-stamped cartons to distributors, and the distributors apply the tax stamps. Typically, tax stamps are applied to a bottom surface of the pack. Generally speaking, then, the bottom surface of the pack, i.e. opposite the intended distribution hole for the cigarettes, is the upper surface of the pack when discussing stamping operations.

Distributors must, thus, open each carton of cigarettes, apply the correct tax stamp to each pack, and close the carton after application of the tax stamp. While these tasks can be performed manually, mechanical assistance is generally used in order to increase throughput.

Historically, an operator of the tax applicator manually adjusted the machine using a series of levers and knobs to adjust the machine to accommodate the differing dimensions of each carton due to brand variances. These machines generally include a common ceiling height and an adjustable floor. Based on the dimensions of a carton to be stamped, the adjustable floor is set to a height that brings the top of the carton to the common ceiling. Such machines reduce potential throughput by precluding stamping more than one height of cartons without adjustment. These machines can be advantageous when attempting to stamp a large number of cartons, but the need for mechanical adjustment makes deployment of such machines difficult in environments that feature smaller orders or require frequent changeover. An exemplary machine in accordance with this approach is disclosed in U.S. Pat. No. 4,265,355 to Davis, assigned to the assignee of this application.

Another approach is to move each station to a different height based on the height of the cartons. For example, United States Patent Application Publication 2004/0084130 to Michalski, and assigned to the assignee of this application discloses such a machine. The Michalski machine uses a series of servo motors controlled by a programmable logic controller to adjust the location of the operable stations based on a measurement made by a measuring station. Meyercord Revenue, Inc., an ITW company, markets a stamping machine incorporating the Michalski technology as the LSM stamping machine.

As each jurisdiction increases cigarette taxes, distributors are attempting to reduce the length of time between application of a tax stamp and distribution to a retailer based on an order. Such attempts are targeted at reducing overhead costs.

Therefore, it would be desirable to provide a system for applying a stamp to packs that would overcome the aforementioned and other disadvantages.

SUMMARY OF THE INVENTION

One aspect of the present invention provides a system for applying a stamp to packs within a carton. The system includes a conveyor system including a plurality of spring arms and a ceiling plate positioned above the spring arms. The system also includes a carton opening system positioned at a first station along the conveyer system, a pack stamping system positioned at a second station along the conveyer system, and a carton closing system positioned at a third station along the conveyor system. The spring arms bias the cartons against the ceiling plate to position the packs at a predetermined distance form the carton opening system, pack stamping system and carton closing system.

Another aspect of the present invention provides a method for applying a stamp to packs within a carton. The method includes biasing the carton along a conveyor system and positioning the packs within the carton at a predetermined location from operation stations based on the biasing.

Another aspect of the present invention provides a system for applying a stamp to packs within a carton. The system includes means for biasing the carton along a conveyor system, and means for positioning the packs within the carton at a predetermined location from operation stations based on the biasing.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF THE PRESENTLY PREFERRED EMBODIMENTS

Figure 1:
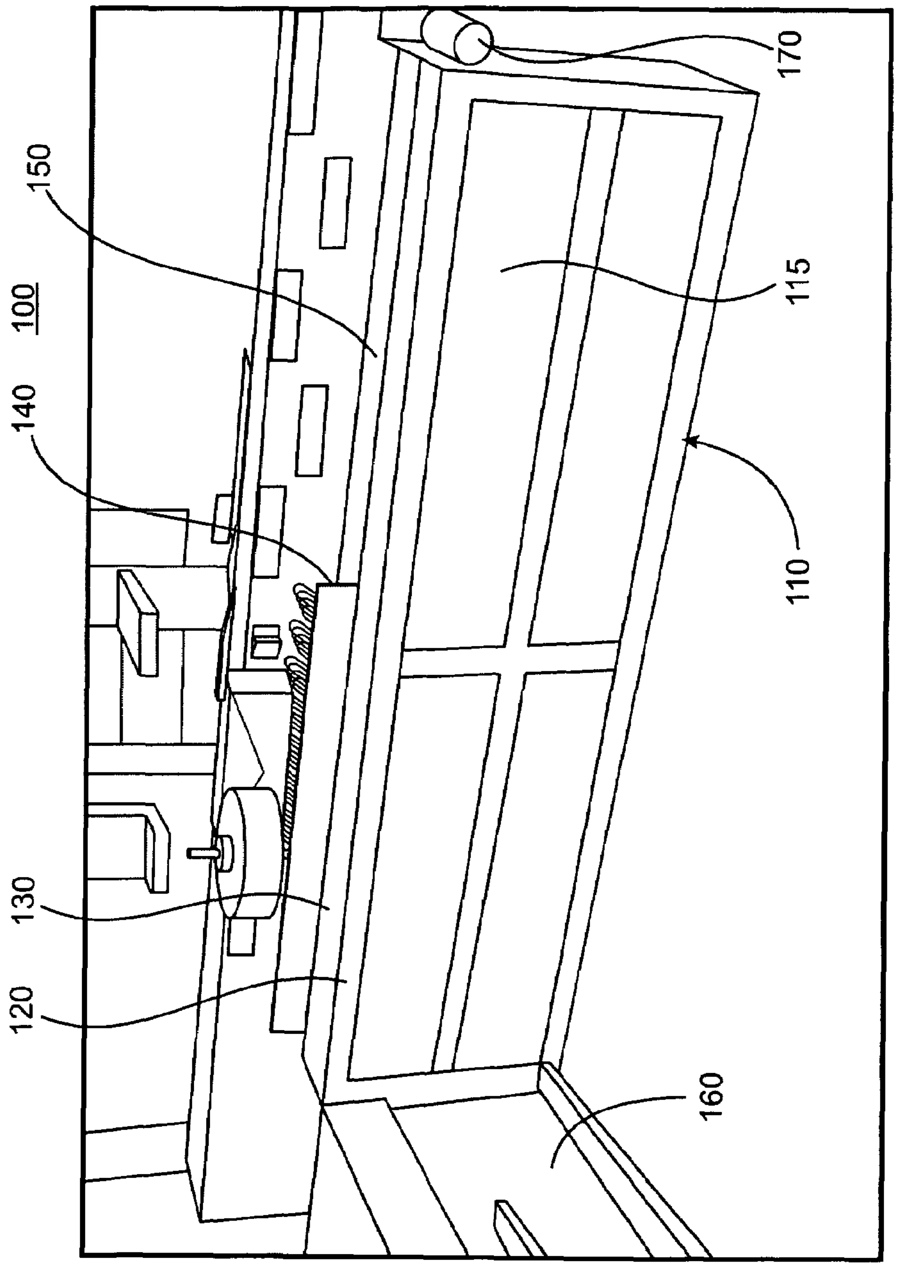
FIG. 1 illustrates one embodiment of a system for applying a stamp to packs within a carton in accordance with one embodiment of the present invention.

FIG. 1 illustrates one embodiment of a system for applying a stamp to packs within a carton in accordance with one embodiment of the present invention. System 100 includes a conveyor system 110, a ceiling plate 120 positioned above spring arms (see FIG. 2), a carton opening system 130 positioned at a first station, a pack stamping system 140 positioned at a second station, and a carton closing system 150 positioned at a third station. As a carton travels through the system, the carton first goes through the first station 130 to open the carton flaps. Having been opened, each pack within the carton is stamped at the second station 140 after opening the carton flaps. Each carton is then closed at the third station 150 after each pack within the carton has received the appropriate stamp. Closing the opened carton includes applying an adhesive, or sealing, the carton flaps, and closing the flaps. In one embodiment, the carton closing system includes a sealing system station to apply the adhesive and a closing station to position the flaps to adhere together and close the carton. FIG. 1 also illustrates a first conveyor belt 160 configured to feed cartons into the system 100, as well as a second conveyor belt (not shown) configured to receive cartons from system 100 and transfer the processed cartons for further processing. For example, the further processing can include boxing a plurality of cartons, such as 30 cartons, into a box for distribution to a retailer. FIG. 1 further illustrates a front wall 115 (described further in FIG. 2 as front wall 210).

Figure 2:
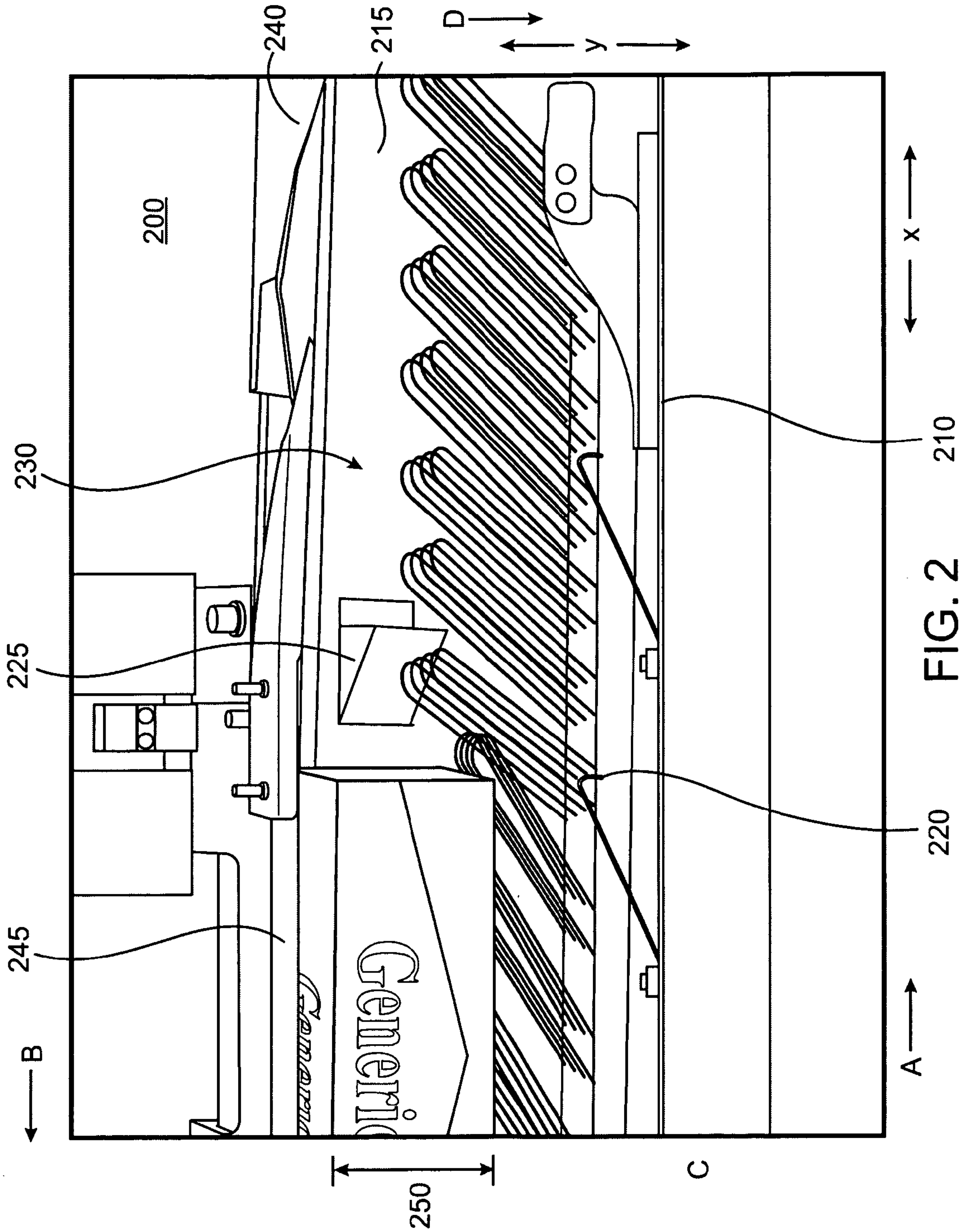
FIG. 2 illustrates a close up view in perspective of a system for applying a stamp to packs within a carton, in accordance with one embodiment of the present invention.

FIG. 2 illustrates a close up perspective view at 200 of the system illustrated in FIG. 1. As seen in FIG. 2, the system 200 includes a front wall 210 and a rear wall 215. System 200 further includes ceiling plate 245 and at least one spring arm 230. The front wall 210, rear wall 215, ceiling plate 245, and spring arms 230 define a carton space configured to hold a carton in a position such that a surface of the carton is adjacent the ceiling plate. As seen in FIG. 2, front wall 210 is in an open configuration and not substantially parallel with rear wall 215, whereas front wall 210 is substantially parallel with rear wall 215 when the system 200 is operational.

Figure 2A:
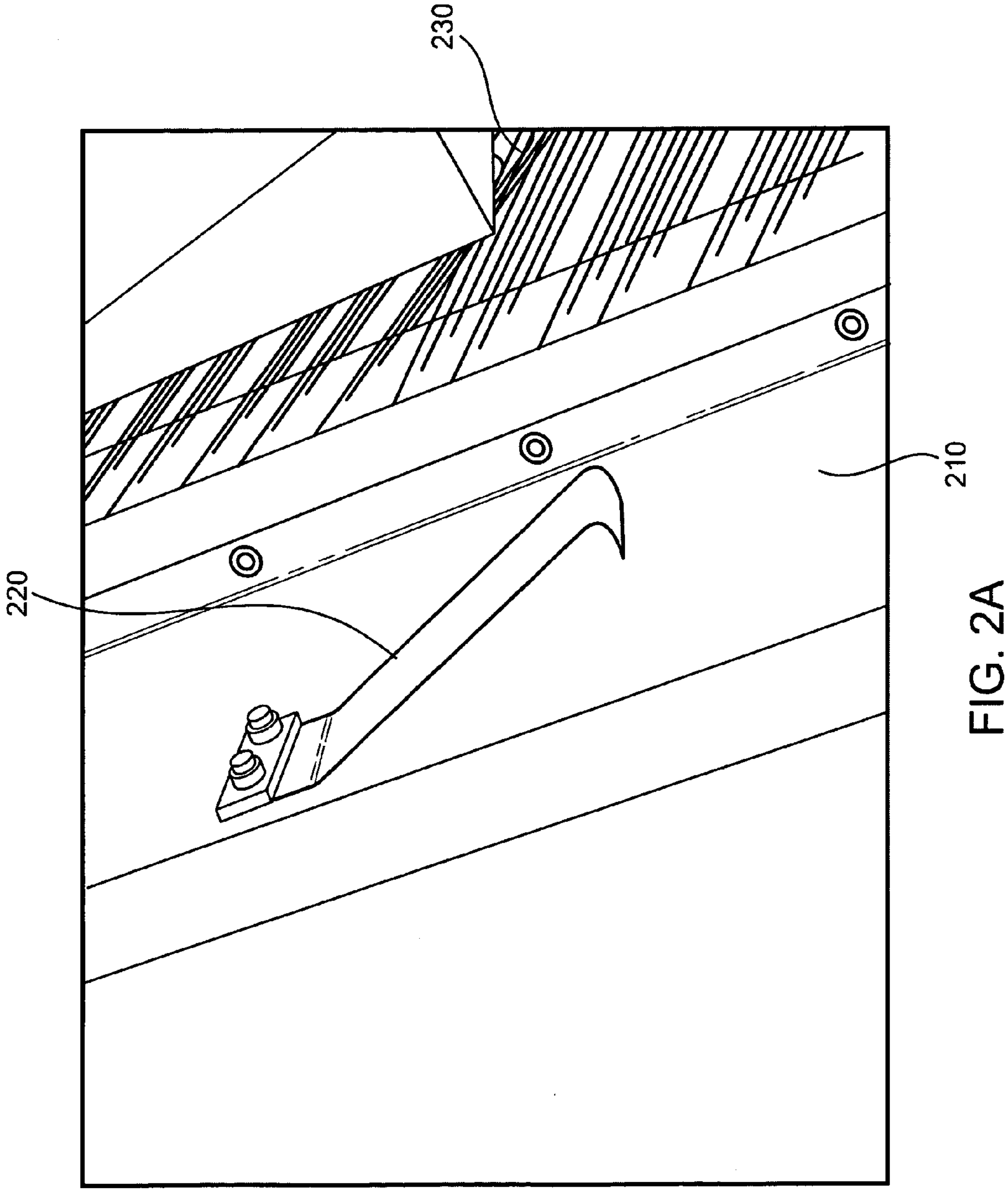
FIG. 2A is a close up view in perspective of a retainer clip, in accordance with one embodiment of the present invention.

Front wall 210 includes at least one stationary retainer clip 220. Each stationary retainer clip 220 is configured to maintain a carton position, and to allow cartons to move in a first direction through the system, while preventing cartons from moving in a direction opposite the first direction. For example, stationary retainer clip 220 includes a spring biased in direction C, such that the movement of a carton over the stationary retainer clip 220 deflects stationary retainer clip 220 in direction D, and upon the carton traveling beyond the stationary retainer clip 220, the stationary retainer clip 220 resumes the biased position by moving in direction C. FIG. 2A illustrates a close up view of a stationary retainer clip 220. In one embodiment, front wall 210 is hingedly connected to a base, and configured to rotate between a closed operable position, and an open position for cleaning and/or repair. FIG. 1 illustrates the front wall 115 in a closed operable position, while FIG. 2A illustrates the front wall 210 in an open position.

Rear wall 215 translates laterally, and substantially parallel with the axis defined by line x, and is driven by a source of power, such as a motor (not shown in FIG. 2). Rear wall 215 includes at least one moving pusher block 225 configured to move each carton along the system 200. Each moving pusher block 225 is configured to slide down and away from the carton being processed while rear wall 215 is translating in a backward direction B, and to extend out and into the carton space prior to rear wall translating forward in direction A. Movement of the rear wall 215 in direction B, against the movement of the cartons, results in the carton forcing or biasing each moving pusher block 225 out of the carton space 250. Each moving pusher block 225 pushes on the upstream end of the cartons to drive each carton down the length of system 200.

Spring arms 230 extend upwardly into carton space 250 and toward the ceiling plate 245. Each spring arm 230 is configured with a spring force sufficient to accept varying pack lengths. In one embodiment, each spring arm defines a carton floor defined by biasing the carton against the ceiling plate and each spring arm 230 is deflected away from the ceiling plate a distance proportional to the height of the carton. The spring arms 230 are, for example, disposed in a number of rows along the length of the system 200. In one embodiment, each row of spring arms 230 includes four spring arms, although this number can be modified to include more or fewer spring arms. The spring arms 230 can be independent, or joined together.

Ceiling plate 245 is configured to be at a consistent height relative to the carton opening system, pack stamping system, and carton closing system along the length of the system. The ceiling plate, in one embodiment, includes at least one opening positioned near the opening system, at least one opening positioned near the pack stamping system, and at least one opening positioned near the carton closing system. Each opening is operably positioned to enable the system to open the carton, stamp each pack within the carton, and to close the carton after stamping.

FIG. 2 further illustrates one embodiment of a carton opening system 240. As shown, carton opening system 240 includes a mechanical plate configured to cut through an adhesive joining two flaps of each carton, and to mechanically guide the flaps open. In other embodiments, the carton opening system can include suction cups or the like. For example, carton opening system 240 can include a first angle plate fixedly mounted to a horizontal bed of system 200. The carton opening system 240 can further include an upstanding guide member transversely spaced from the rear wall 215. Offset wheels can apply a force to the carton, causing the carton flap to dome, or arch-up, in preparation for a plow to act upon the carton flaps.

Figure 3:
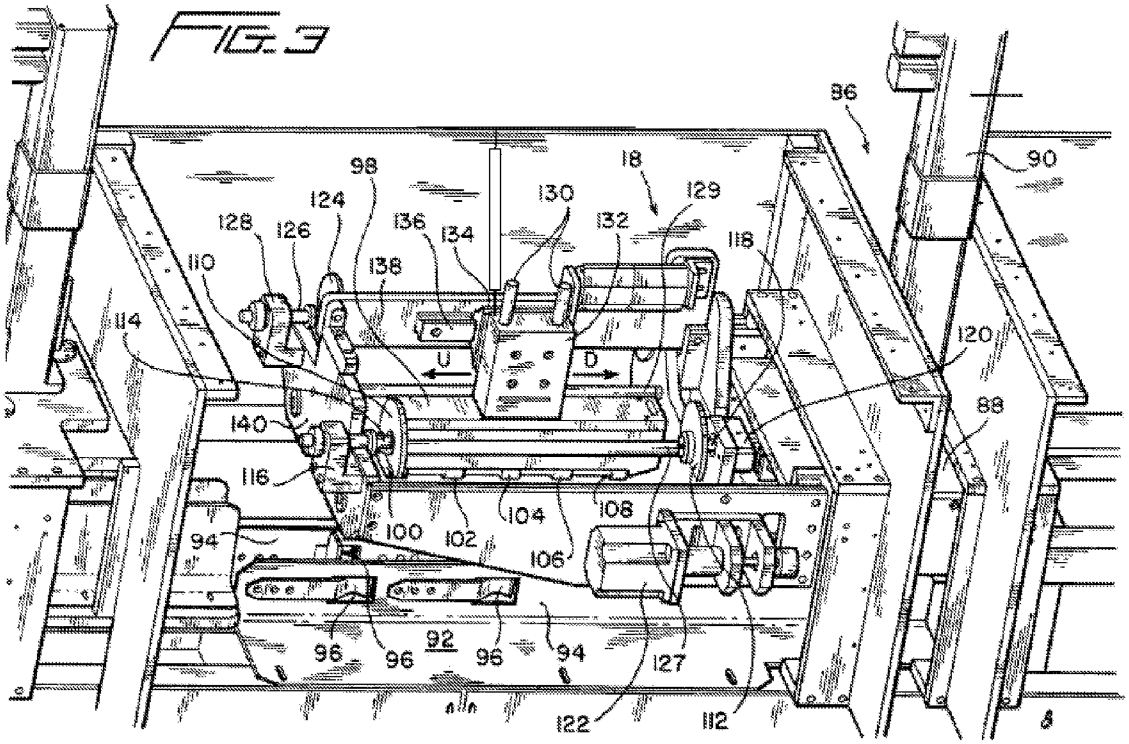
FIG. 3 is an enlarged perspective view of a pack stamping station, in accordance with one aspect of the invention.

With reference now being specifically made to FIG. 3, the details of an exemplary pack stamping system are illustrated. In another embodiment, a pack stamping system in accordance with U.S. patent application Ser. No. 11/685,556 incorporated herein by reference, can be used within the stamping station.

A stamping iron in the form of an iron block 98 is used to apply tax stamps onto the upper surface portions of the individual cigarette packs disposed within the cigarette cartons wherein the bottom or lower surface of the stamping iron 98 is provided with a plurality of longitudinally spaced stamping iron shoes 100, 102, 104, 106, 108.

The tax stamps are provided as waxed impressions upon a supply roll of paper, the opposite ends of which are adapted to be mounted and supported upon a pair of disks 110, 112 of a paper holder assembly, whereby the waxed tax stamps are effectively transferred from the supply roll of paper to the upper surface portions of the individual cigarette packs when the stamping iron shoes 100, 102, 104, 106, 108 come into contact with the waxed tax stamps so as to effectively melt the same. Disk 110 is mounted upon a spindle 114 which is rotatably mounted in a spring-biased manner within a bearing assembly 116 so as to permit the supply roll of waxed tax stamp paper to be inserted between the disks 110,112 when the disk 110 is effectively moved axially away from or relative to the disk 112, while disk 112 is mounted upon a spindle 118 which is rotatably mounted within a bearing assembly 120. Spindle 118 and disk 112 are operatively connected to a servo drive motor assembly 122 by suitable means, not shown, whereby when the supply roll of waxed tax stamp paper is mounted upon the disks 110,112, operation of the servo drive motor 122 serves to appropriately advance the supply roll of waxed tax stamp paper so as to serially present new or fresh tax stamp impressions to the stamping iron shoes 100, 102, 104, 106, 108. For example, the tax stamps are pre-printed or pre-formed upon the supply roll of paper within longitudinally extending rows comprising fifteen tax stamps per row, or in other words, each tax stamp is disposed within a particular row of tax stamps wherein each row of tax stamps has fifteen tax stamp positions.

Accordingly, the stamping iron 98 is provided with the five stamping iron shoes 100, 102, 104, 106, 108 and it is noted that the transverse extent of each one of the stamping iron shoes 100, 102, 104, 106, 108 is large enough so as to effectively cover or thermally interact with both of the cigarette packs disposed within each one of the five columns of cigarette packs disposed within each one of the cigarette cartons. It is further noted that the stamping iron shoes 100, 102, 104, 106, 108 are longitudinally spaced from each other, as shown in FIG. 3, such that when the stamping iron 98 is disposed at a predetermined position at or relative to the pack stamping system, each one of the stamping iron shoes 100, 102, 104, 106, 108 will respectively thermally engage or interact with every third tax stamp preprinted or pre-formed upon the roll of tax stamps. Because the spring arms (FIG. 2) adjust the location of the cartons so that the surface to receive the stamp is at a prescribed height (i.e. the ceiling plate), the lower travel stop of stamping iron 98 can be fixed.

Stamping iron 98 is fixedly mounted upon the lower end portions of a pair of upstanding control rods 130, 130 and that the control rods 130, 130 are movably disposed within an air cylinder assembly 132 so as to provide a predetermined operative stroke for the stamping iron 98. The air cylinder assembly 132 is fixedly mounted upon a support block 134 at a fixed height.

Figure 4:
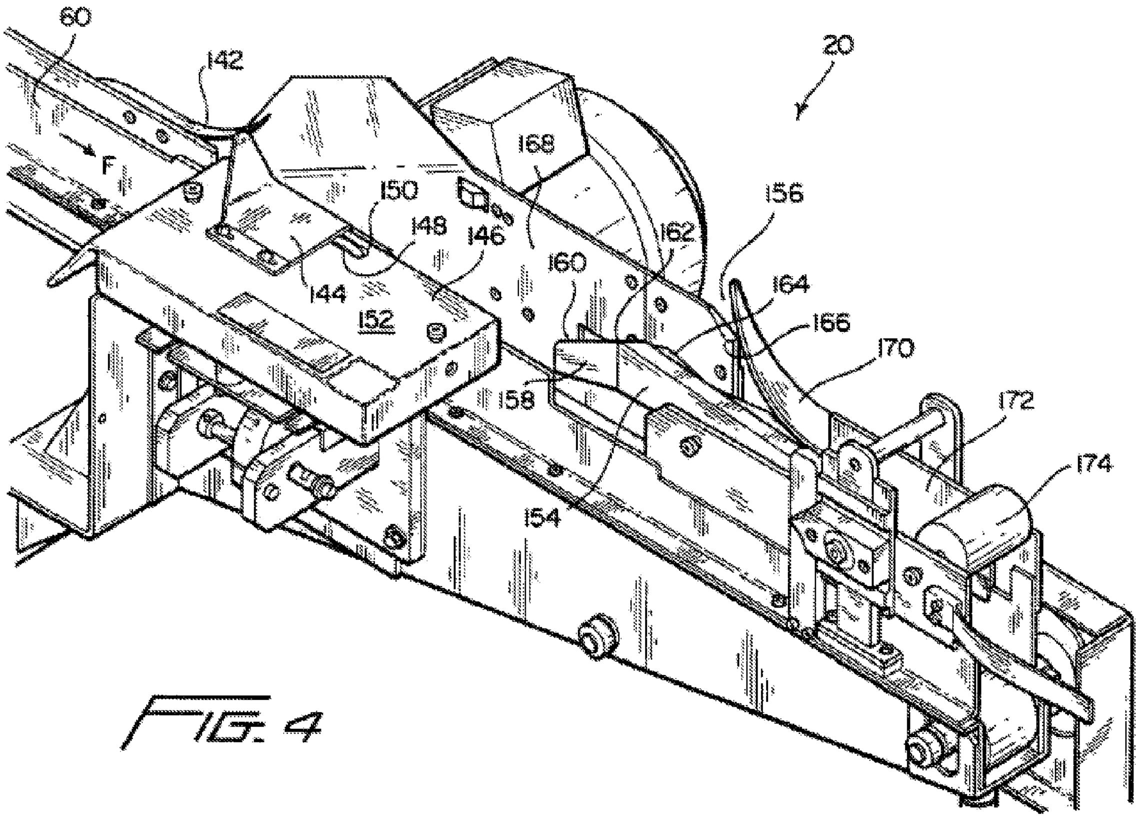
FIG. 4 is an enlarged perspective view of a carton closing station, in accordance with one aspect of the invention.

FIG. 4 illustrates one example of a carton closing system. In another example, an adhesive applicator in accordance with the disclosures of U.S. Provisional Patent Application 60/782,009, U.S. Patent application Ser. No. 11/685563 , incorporated herein by reference, can be implemented.

After stamping each pack, the carton is conveyed from the pack stamping system toward the carton closing system along the cigarette carton conveyance flow path 60. The opened carton has its upper surface flap members disposed in oppositely extending horizontally disposed open states, and such flap members need to be moved through an arcuate path of approximately 180 degrees so as to be disposed in a horizontally oriented, overlapped closed state. The carton which is being conveyed along the flow path 60 in the flow direction noted by means of the arrow F, has a smaller one of the upper surface cigarette carton flap members extending toward the left of the flow path 60 as viewed in FIG. 4, while the larger one of the upper surface cigarette carton flap members extends toward the right of the flow path as viewed in FIG. 4.

Accordingly, an upwardly arcuate leaf plate member 142 is provided upon the upstream end of the carton closing system to engage the rightward extending larger one of the upper surface carton flap members and thereby cause the same to attain a substantially vertical orientation as the carton is moved along the flow path 60, while the leftward extending, horizontally disposed smaller one of the upper surface carton flap members is caused to pass beneath a guide bracket 144. The guide bracket 144 is fixedly mounted atop an adhesive dispenser, such as glue pot 146, and a portion of a glue applicator wheel 148, rotatably mounted within an interior portion of the glue pot 146, projects upwardly through a slot 150 defined within an upper surface portion 152 of the glue pot 146 so as to apply a suitable adhesive or glue to an undersurface portion of the horizontally extending smaller one of the upper surface cigarette carton flap members when such flap member is so disposed in its open state.

At an intermediate downstream location of the carton closing system, a pair of carton flap closers 154, 156 operate to close the carton flaps. The upstream end portion of the carton flap closer 154 is disposed axially upstream with respect to the upstream end portion of the carton flap closer 156. This structural arrangement of the flap closers 154,156 therefore permits the flap closer 154 to begin or initiate closure of the smaller carton flap member before closure of the larger carton flap member is commenced or initiated in order to facilitate the overlapped folding, closure, and sealing of the flap members with respect to each other.

Flap closer 154, which is adapted to engage the smaller carton flap member in order to initiate the folding movement thereof from its leftward extending opened position toward its rightward extending closed position, comprises an upstream end tab portion 158 which has an upwardly inclined upper edge surface 160. The upper edge surface 160 terminates at an elevated point or apex portion 162, and a downwardly sloped surface portion 164 extends downwardly from the apex portion 162.

In this manner, as the smaller carton flap encounters the flap closer 154, the upwardly inclined edge surface 160 will cause the smaller carton flap to be moved from its leftwardly extending horizontally disposed opened position to a substantially vertical position, and as a result of the momentum engendered by means of such movement of the smaller flap member, as well as the momentum characteristic of the movement of the carton along the flow path 60, the smaller carton flap will tend to move downwardly along the downwardly sloped surface portion 164 until the smaller carton flap is disposed in its rightwardly extending horizontally disposed closed position.

Flap closer 156 comprises two cooperative components for moving the larger carton flap member, which has already been moved to a substantially vertical state by means of the arcuate leaf plate member 142, from the substantially vertical state to a leftwardly extending horizontally disposed closed state. In particular, the first cooperative component of the flap closer 156 comprises a tab member 166 which is integrally mounted upon a rear wall member 168 partially defining the flow path 60 and which extends transversely inwardly with respect to the flow path 60. The second operative component of the flap closer 156 comprises a downwardly extending arcuate plate member 170.

As the vertically oriented larger carton flap encounters the transversely inwardly extending tab member 166, the larger carton flap will begin to be folded as a result of having been caused to move from its vertical orientation toward a horizontal orientation or disposition, and when the partially folded larger carton flap then encounters the downwardly extending arcuate plate member 170, the larger carton flap member will have been folded atop the smaller carton flap member which will have just previously completed its folding operation as a result of having traversed or moved along the downwardly sloped surface portion 164 of the smaller carton flap closer 154. The previously applied glue or adhesive is now disposed upon the upwardly facing surface portion of the smaller carton flap member whereby the larger carton flap member, which has been folded over the smaller carton flap member in an overlapping mode, can be adhered thereto so as to in fact seal the carton in a closed state. In order to ensure that the larger and smaller carton flap members are in fact secured together in their overlapped folded and sealed mode, the carton closing system further comprises a downstream sealing section which comprises a pressure plate 172 and a pressure roller 174. As the folded overlapped carton flap members pass beneath the pressure plate 172 and the pressure roller 174, the larger overlapping carton flap member is forced into pressured engagement with the underlying smaller carton flap member so as to be securely adhered thereto.

Figure 5:
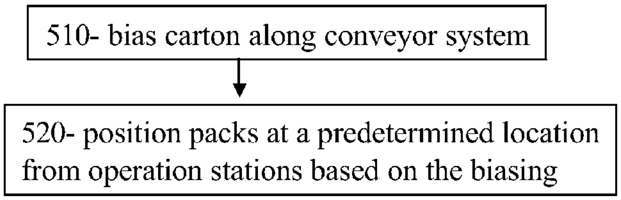
FIG. 5 is a flowchart illustrating one example of a method for applying a stamp to packs within a carton, in accordance with another aspect of the invention.

FIG. 5 illustrates a flowchart illustrative of a method 500 for applying a stamp to packs within a carton, in accordance with another aspect of the invention.

Method 500 begins at 510 by biasing the carton along a conveyor system. The carton is biased to place an upper surface of the carton at a desired position, such that regardless of the height of the carton, the upper surface will be held at the desired position. For example, the carton can be biased using spring arms, such as spring arms 230 to place an upper surface of the carton against a ceiling plate, such as ceiling plate 245.

At step 520, the packs are positioned at a predetermined location from operation stations based on the biasing. For example, the predetermined location is defined by a lower surface of a ceiling plate. As the carton is conveyed along a stamping system, the cartons are maintained with the position of the upper surface abutting the ceiling plate, while operation stations, such as a carton opening station, pack stamping station, and carton closing station perform their functions.

Figure 6:
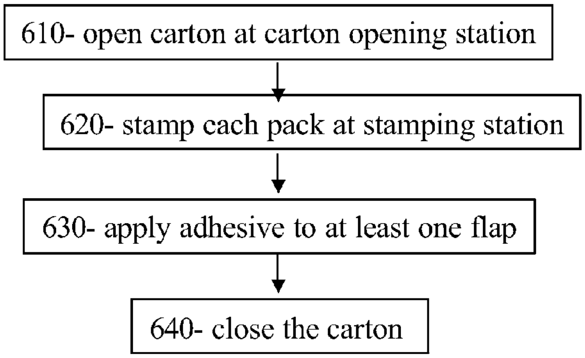
FIG. 6 is a flowchart illustrating another method for applying a stamp to packs within a carton, in accordance with another aspect of the invention.

FIG. 6 illustrates a method 600 for applying stamps to a biased carton in accordance with one aspect of the invention. Method 600 begins at 610, wherein a biased carton is opened at a carton opening station. The carton opening station is an exemplary operation station referenced in step 520 of method 500.

At step 620, each pack of the biased and positioned carton is stamped at a stamping station. The stamping station is an exemplary operation station referenced in step 520 of method 500.

At step 630, adhesive is applied to at least one flap of the opened and biased and positioned carton after stamping each pack at an adhesive station. The adhesive station is an exemplary operation station referenced in step 520 of method 500.

At step 640, the biased and positioned carton is closed, after application of the adhesive, at a closing station. The closing station is an exemplary operation station referenced in step 520 of method 500.

It is important to note that the figures and description illustrate specific applications and embodiments of the present invention, and is not intended to limit the scope of the present disclosure or claims to that which is presented therein. Upon reading the specification and reviewing the drawings hereof, it will become immediately obvious to those skilled in the art that myriad other embodiments of the present invention are possible, and that such embodiments are contemplated and fall within the scope of the presently claimed invention.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A system for applying a stamp to packs within a carton, the system comprising:

a conveyor system including a plurality of spring arms;

a ceiling plate positioned above the spring arms;

a carton opening system positioned at a first station along the conveyer system;

a pack stamping system positioned at a second station along the conveyer system;

a carton closing system positioned at a third station along the conveyor system; wherein the spring arms bias the cartons against the ceiling plate to position the packs at a predetermined distance from the carton opening system, pack stamping system and carton closing system.

2. The system of claim 1 wherein the carton closing system includes a sealing system station and a closing station.

3. The system of claim 2 wherein the closing station and carton opening system comprises mechanical means for closing and opening cartons.

4. The system of claim 1 wherein the conveyor system includes a carton space defined by a front wall, a rear wall, the spring arms, and the ceiling plate, and wherein the front wall includes at least one stationary retainer clip configured to maintain a carton position, and wherein the back wall comprises at least one moving pusher block to move each carton along the conveyor system.

5. The system of claim 1 wherein the spring arms are configured with a spring force to accept varying pack lengths.

6. The system of claim 1 wherein the carton includes a height, and wherein the at least one spring arm defines a carton floor, and wherein the at least one spring arm bias the carton against the ceiling plate, and wherein the at least one spring arm is deflected away from the ceiling plate a distance proportional to the height of the carton.

7. The system of claim 1 wherein the ceiling plate is at a uniform height relative to the opening system, pack stamping system, and carton closing system.

8. The system of claim 7 wherein the ceiling plate includes at least one opening positioned near the carton opening system, at least one opening positioned near the pack stamping system, and at least one opening positioned near the carton closing system.

9. The system of claim 1 wherein the system applies tax stamps to cigarette packs within a carton of cigarettes.

10. The system of claim 1 wherein the system further comprises a front wall and a rear wall, wherein the front wall, rear wall, spring arms and ceiling plate define a carton space configured to hold the carton in a position such that a surface of the carton is adjacent the ceiling plate.

11. The system of claim 10 wherein the front wall is moveable between an open configuration and a closed configuration such that the front wall and rear wall are substantially parallel in the closed configuration and the front wall and rear wall are not substantially parallel in the open configuration.

* * * * *